(12) United States Patent
Todorof (10) Patent No.: US 8,269,369 B2
(45) Date of Patent: Sep. 18, 2012

(54) DIRECT DRIVE WIND TURBINE AND BLADE ASSEMBLY

(76) Inventor: Bill Todorof, Fairfield, IA (US)

( * ) Notice: Subject to any disclaimer, the term of this patent is extended or adjusted under 35 U.S.C. 154(b) by 0 days.

(21) Appl. No.: 13/073,672

(22) Filed: Mar. 28, 2011

(65) Prior Publication Data

US 2011/0169270 A1 Jul. 14, 2011

Related U.S. Application Data (63) Continuation of application No. 12/130,600, filed on May 30, 2008, now Pat. No. 7,939,958.

(60) Provisional application No. 60/941,565, filed on Jun. 1, 2007.

(51) Int. Cl.
*F03D 9/00* (2006.01)

(52) U.S. Cl. .................. 290/55; 415/4.2; 416/1

(58) Field of Classification Search ........................ None
See application file for complete search history.

(56) References Cited

U.S. PATENT DOCUMENTS

| | | | | |
|---|---|---|---|---|
| 4,087,202 A | * | 5/1978 | Musgrove | 416/41 |
| 4,291,235 A | | 9/1981 | Bergey et al. | |
| 4,421,458 A | * | 12/1983 | Allan et al. | 416/117 |
| 4,435,646 A | * | 3/1984 | Coleman et al. | 290/44 |
| 4,718,821 A | * | 1/1988 | Clancy | 416/44 |
| 4,720,640 A | | 1/1988 | Anderson et al. | |
| 5,595,474 A | * | 1/1997 | Girard | 416/1 |
| 7,154,193 B2 | | 12/2006 | Jansen et al. | |
| 7,677,862 B2 | * | 3/2010 | Boatner | 415/4.2 |
| 2007/0205603 A1 | | 9/2007 | Appa et al. | |
| 2007/0231139 A1 | | 10/2007 | Yokoi | |
| 2008/0095631 A1 | * | 4/2008 | Bertony | 416/197 A |
| 2009/0160284 A1 | | 6/2009 | Kimura et al. | |
| 2010/0133838 A1 | | 6/2010 | Borgen | |

* cited by examiner

*Primary Examiner* — Michael Zarroli
(74) *Attorney, Agent, or Firm* — McKee, Voorhees & Sease, P.L.C.

(57) ABSTRACT

Apparatuses and methods for a wind turbine and blade assembly are disclosed. The wind turbine has a wind turbine assembly being rotatably driven by the blade assembly. The wind turbine assembly has a shaft connected to an inner wheel by a supporting structure. A magnet array is disposed circumferentially about the inner wheel. A transformer array is disposed circumferentially about an outer wheel. The shaft rotates the inner wheel with the magnet array within the outer wheel having the transformer array for producing electricity. Magnets within the array are angled relative to the inner wheel. Blades are held in a neutral position into the wind by tensioning means. Rotation of the blades out of the wind is resisted by the tensioning means to tune the blades to the wind velocity.

12 Claims, 6 Drawing Sheets

DIRECT DRIVE WIND TURBINE AND BLADE ASSEMBLY

CROSS REFERENCE TO RELATED APPLICATION

This application is a Continuation application of U.S. Ser. No. 12/130,600 filed May 30, 2008, which claims priority under 35 U.S.C. §119 to provisional application Ser. No. 60/941,565 filed Jun. 1, 2007, herein incorporated by reference in their entirety.

FIELD OF THE INVENTION

This invention relates to a wind turbine. Specifically, this invention relates to an improved wind turbine and blade assembly for direct drive (gearless) wind turbines.

BACKGROUND OF THE INVENTION

It is known that energy farming and production using renewable resources is becoming increasingly important as the costs of nonrenewable fuels such as fossil fuels continue to rise, and earth's nonrenewable resources are depleted more and more each day. It can also be appreciated that harvesting wind energy in residential and rural settings for powering energy needs for such activities that occur in residential and rural settings are beneficial in addition to commercial scale wind farms that harvest, develop and produce electricity. Although large-scale wind turbines work well for harvesting electricity on commercial and industrial scales, these wind turbines are not amenable to use in more of a residential and rural setting. Therefore, there is a need to provide an improved wind turbine and blade assembly that scales effectively to a wide variety of different sizes, and is affordable, reliable, simple and cost-effective and thereby amenable for use in residential and rural settings to harvest wind energy capable of meeting utility needs for such settings.

It can also be appreciated that a wind turbine and blade assembly that is fully scalable would be advantageous for producing wind turbines with multiple wattage outputs.

Therefore, it is another feature of the present invention to provide a wind turbine and blade assembly being fully scalable to have different wattage outputs.

Because of the heat generated, especially in wind turbines that use gearing systems to operate at multiple speeds, and the combination of usage and environmental factors that can lead to system failure, whether by excessive winds, intense ambient heat or other elements, and the wear on the blades and experienced by moving parts within the wind turbine, the service life of the wind turbine may be unduly shortened, with increased deployment costs particularly as the turbines servicing requirements increase or the useful life of the turbine is shortened.

Therefore, there is a need to provide an improved wind turbine and blade assembly that is more easily serviceable in part by requiring fewer parts that require service, and by locating more of the serviceable parts and components of the wind turbine near the tower used to support the wind turbine and blade assembly.

Residential and rural wind turbines and blade assemblies usually have blades which are smaller than those used in commercial or industrial production of electricity using commercial or industrial scale turbines. Many of these turbines, including smaller scale wind turbines, require large amounts of wind energy to start the rotation of the blade assembly by breaking the cogging torque generated by a magnetic flux density within the wind turbine assembly.

Therefore, there is a need to provide a wind turbine and blade assembly wherein the cogging torque is reduced thereby reducing the stresses on the wind turbine and blade assembly and increasing the rotational startup for smaller and medium wattage wind turbines.

It is also well known that the blade assembly is an integral component to a wind turbine. More specifically, the less wind energy necessary for rotating the blade assembly translates into an increased efficiency of the wind turbine or the capability of the wind turbine to harvest more wind energy at lower wind velocities.

Therefore, there is a need to provide a blade assembly being contoured to increase the efficiency of the blade assembly by extracting more energy from less wind, and to extract more energy from a smaller rotational diameter.

In addition to the desire to increase blade efficiency, it is well known in the art of wind turbines that the blade assembly can experience catastrophic forces from excessive or high-velocity winds, thereby causing failure of the blade assembly and wind turbine.

Therefore, in systems with either small or large blade diameters, there is a need to provide a blade assembly that is designed to mitigate and/or prevent the damage that may result to the blade assembly and wind turbine from excessive or high-velocity winds by configuring the blade assembly such that the blades are rotated out of the wind, and by the wind, relative to the magnitude of force exerted on the blade by the wind.

Present wind turbines rely on wind diagnostics and analysis hardware or systems to assess the velocity and other factors relating to the approaching and passing wind. The hardware and systems are in communication with blade pitch controls to pitch or tune the blades depending on the velocity or other factors associated with the approaching and passing wind. The blades are then turned into the wind to the desired blade pitch/angle to control the velocity or RPM of blade rotation. This type of turbine design unnecessarily requires the added expense of wind diagnostics and analysis hardware or systems to assess the wind and then provide correction to the angle of the blades. These current apparatuses and methods that use added electromechanical control systems for blade rotation require an increased parts count with increased service requirements and multiple points of failure. And, there is increased latency in an electromechanical approach which makes it less responsive to wind bursts and rapid changes in wind velocity.

Because direct drive turbines do not have the braking characteristics of gear-based systems, it is known that braking systems are an important element of direct drive turbine designs. The process of turning the blades in the instant invention provides an alternative or enhancement to mechanical braking systems.

Therefore, a need has been identified in the art to provide an improved wind turbine and blade assembly where the blade assembly includes built-in means to automatically and simultaneously tune or control the angle of the blades relative to and by the wind force acting on the blades by controlled resistance of the blades out of the wind.

In light of the foregoing, there is a need in the art for an improved wind turbine and blade assembly for direct drive (gearless) wind turbines having the previously described features and advantages.

Thus, the primary feature or advantage of the present invention is an improved wind turbine and blade assembly for direct drive (gearless) wind turbines.

One or more of these and/or other features or advantages of the present invention will become apparent from the specification and claims that follow.

BRIEF SUMMARY OF THE INVENTION

One or more of the foregoing features or advantages may be achieved by a direct drive wind turbine driven by a blade assembly. The direct drive wind turbine includes a frame enclosed by a housing, a shaft rotatably supported by the frame, a magnet array attached to and arranged circumferentially about an inner wheel attached to the shaft so that each magnet is angled relative to the inner wheel to reduce cogging torque, a transformer array arranged circumferentially about an outer wheel attached to the frame, and the inner wheel being rotated within and relative to the outer wheel to produce electricity. In a preferred form, the direct drive wind turbine includes each magnet being angled between 5-45 degrees, more specifically at between 8 and 16 degrees, and optimally at 15 degrees, relative to a line perpendicular to opposing outer peripheral edges of the inner wheel to reduce cogging torque.

In yet another aspect of the present invention, a direct drive wind turbine is disclosed. The wind turbine includes a shaft rotatably supported by a frame, a magnet array attached to and arranged circumferentially about an inner wheel attached to the shaft, a transformer array attached to and arranged circumferentially on an outer wheel attached to the frame, a blade assembly having a plurality of blades where each blade is attached to a plug coupled within a socket attached to a blade hub attached to the shaft, and a tensioning means is enclosed within the socket and configured to act on the plug to resist movement of the blade out of the wind from a neutral position facing into the wind. In a preferred form, the tensioning means is calibrated to automatically adjust blade pitch relative to the speed of the wind acting on the blades so that the blades automatically rotate out of the wind from the neutral position under the force of the wind as wind speed increases.

According to another aspect of the present invention, a new method for generating electricity using a direct drive wind turbine is disclosed. The method includes the steps of: providing a frame enclosed by a housing, a shaft rotatably supported by the frame, a magnet array attached to and arranged circumferentially about an inner wheel attached to the shaft, and a transformer array arranged circumferentially about an outer wheel attached to the frame; angling the magnets relative to the inner wheel; and rotating the inner wheel within and relative to the outer wheel to produce electricity. In a preferred form, the method includes angling each magnet is angled between 5-45 degrees relative to a line perpendicular to opposing outer peripheral edges of the inner wheel to reduce cogging torque.

According to still another aspect of the present invention, a method for generating electricity using a direct drive wind turbine is disclosed. The method includes the steps of: providing a shaft rotatably supported by a frame, a magnet array attached to and arranged circumferentially about an inner wheel attached to the shaft, a transformer array attached to and arranged circumferentially on an outer wheel attached to the frame, and a blade assembly comprising a plurality of blades so each blade is attached to a plug coupled within a socket attached to a blade hub attached to the shaft; resisting rotation of the blades away from a neutral position with a tensioning means enclosed within the socket; and rotating the inner wheel within and relative to the outer wheel to produce electricity. In a preferred form, the method also includes the steps of: urging the blades back to the neutral position using the tensioning means; and self-tuning the blades by automatically and instantaneously rotating out of the wind away from said neutral position under the force of and relative to the wind speed.

DETAILED DESCRIPTION OF THE PREFERRED EMBODIMENT

Figure 1:
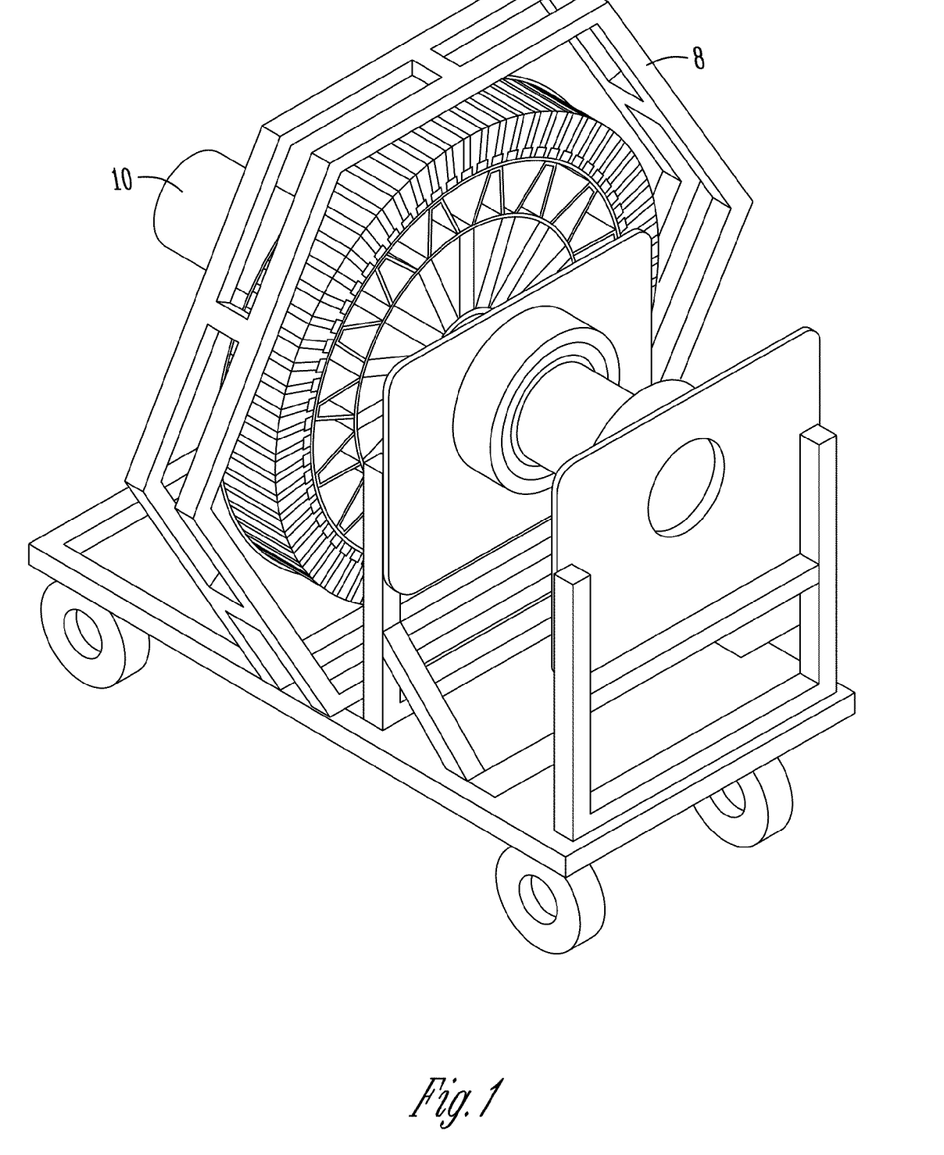
FIG. 1 is an isometric view of the wind turbine assembly positioned in a portable cart according to an exemplary embodiment of the present invention.
Figure 2:
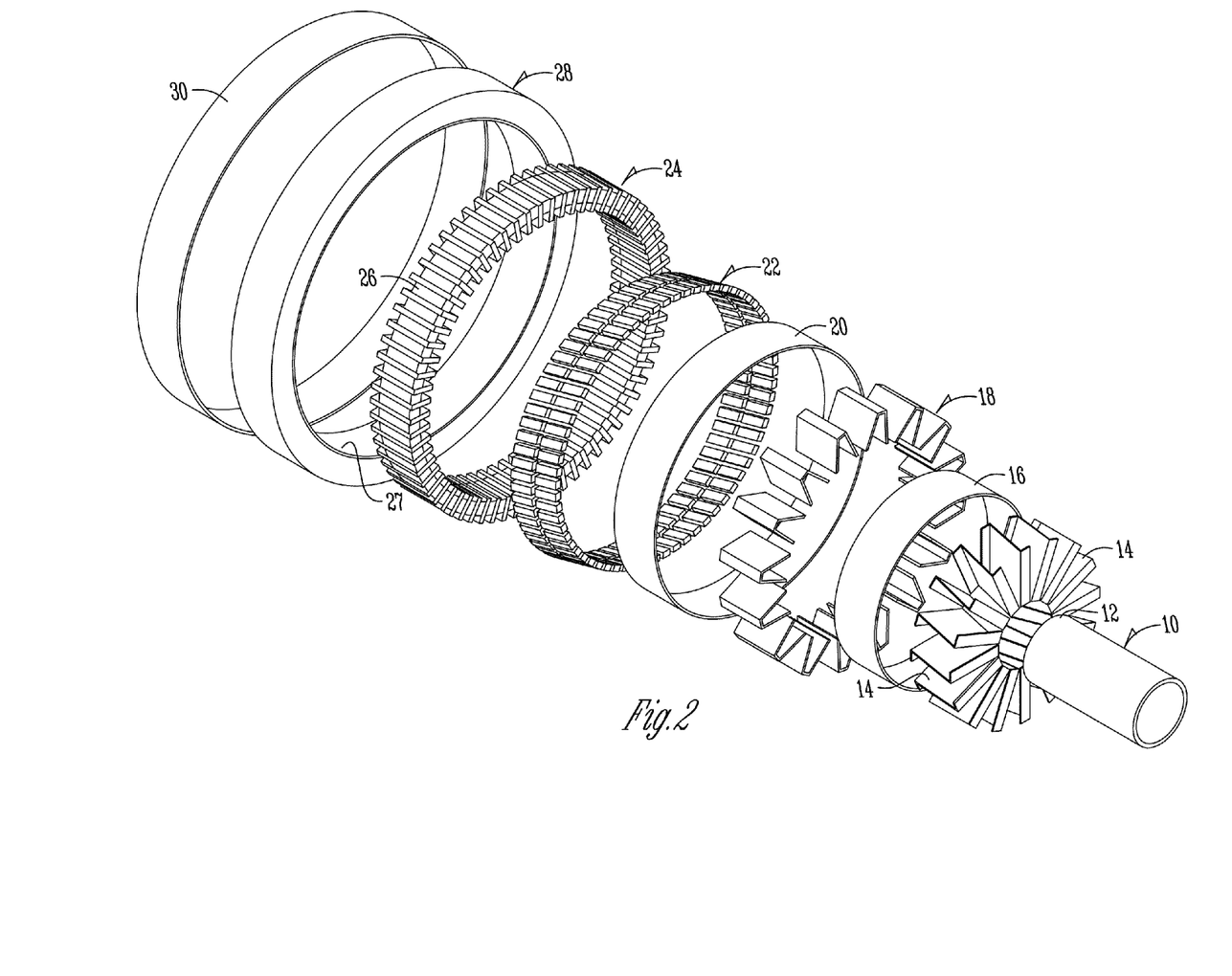
FIG. 2 is an exploded view of the wind turbine assembly according to an exemplary embodiment of the present invention.

FIGS. 1 and 2 illustrate an isometric view of the electrical generating component of the wind turbine assembly according to an exemplary embodiment of the present invention. For purposes of illustration and even demonstration, the electrical generating component of the wind turbine assembly is shown mounted to a portable cart 8. The electrical generating component of the wind turbine assembly can take on various operational configurations as the design of the component is truly scalable up or down based on the desired electrical output.

FIGS. 1-6 illustrate the various possible components and configurations for the wind turbine assembly. Each of the possible components for one embodiment of the wind turbine assembly is best illustrated in the exploded and sectional views shown in FIGS. 2 and 3.

Figure 3:
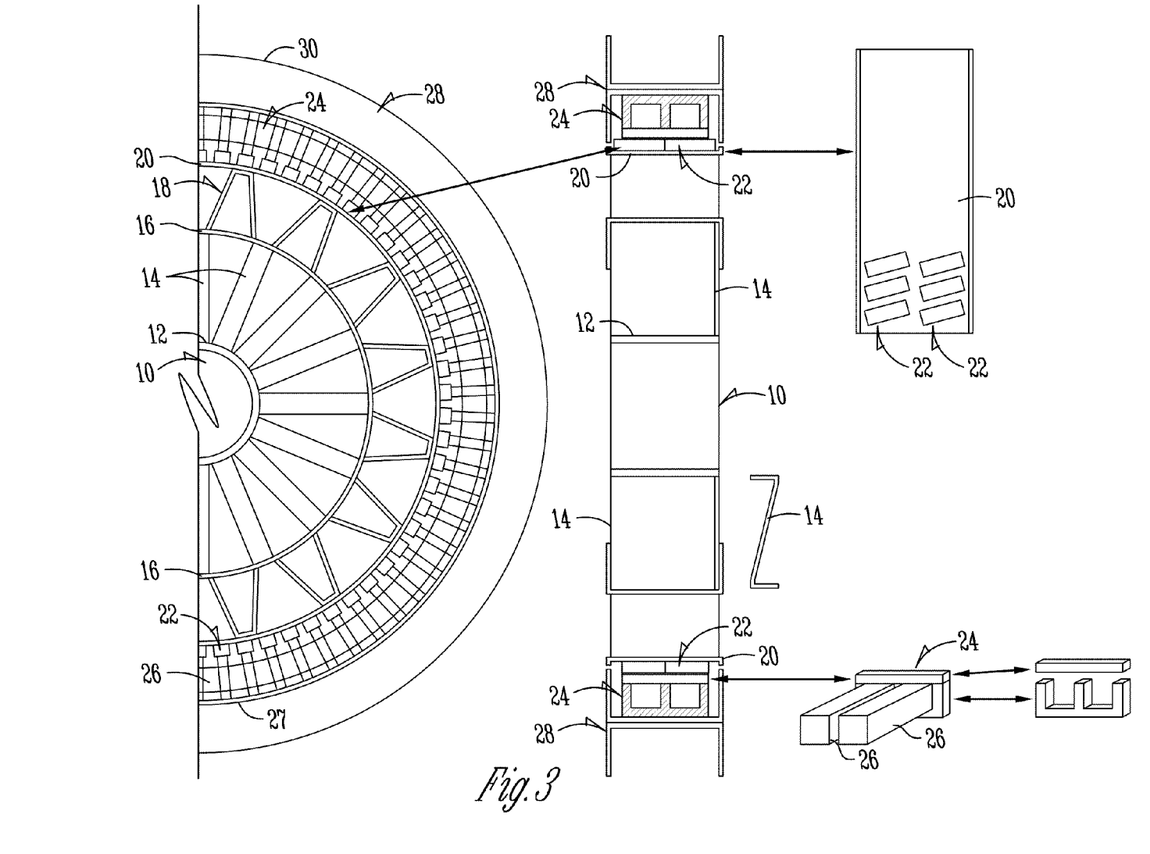
FIG. 3 is a sectional view of the wind turbine assembly according to an exemplary embodiment of the present invention.

The basic structure of the wind turbine assembly, according to an exemplary embodiment of the present invention, has a central shaft 10 connecting the blade assembly to the wind turbine assembly. The shaft 10 is connected to a shaft coupling ring 12 on which a series of supporting structures, such as for example, radial spokes 14 (also called spoke 14 members, because a 'Z' shaped design provides structural stability) that are mounted to support a spoke rim 16 surrounded by a magnet cooling channel 18 that, in turn supports an inner wheel 20 (also called a c-channel, because use of a 'C' shaped rim, where concave side of the 'C' shape faces outward to provide a pocket in which the magnets can be securely mounted, and also called a magnet tray because it is the support member where the magnets are mounted) upon which the magnet array 22 is mounted. The magnet array 22 is attached to and arranged circumferentially about the inner wheel 20 attached to the shaft 10. Each magnet is angled relative to the inner wheel 20 to reduce cogging torque. In a preferred form, each magnet is angled between 5-45 degrees relative to a line perpendicular to opposing outer peripheral edges 52 of the inner wheel 20 to reduce cogging torque. Optimally, each magnet may be angled at 15 degrees relative to a line perpendicular to opposing outer peripheral edges 52 of said inner wheel 20 to reduce cogging torque. Those skilled in art can appreciate that the angle of the magnets relative to peripheral edges 52 may be altered commensurate with the spirit and design of the present invention. The shaft 10, shaft coupling ring 12, radial spokes 14, spoke rim 16, magnet cooling channel 18, inner wheel 20 and magnet array 22 are all rigidly fixed together and rotate together inside the wind turbine housing.

Surrounding the inner wheel of the turbine is an outer wheel 27 where a transformer array 24 is interconnected with an electrical coil 26 and the transformers are attached to the outer wheel 27. The transformer array 24 is arranged circumferentially about the outer wheel 27, which is attached to the frame 8. Surrounding and attached to the outer wheel 27 is a coolant jacket 28 held in place by an outer rim 30 also attached to frame 8.

The inner wheel 20 assembly is connected to the blades 40 at one end of the shaft 10 and the other end of the shaft 10 is rotatably attached to the frame 8 via a pillow bearing. The outer wheel 27 is attached to the frame 8 in a fixed position and does not move, while the inner wheel 20 spins inside the outer wheel 27 as the blades turn the shaft 10 attached to inner wheel 20 by the aforementioned supporting structure.

One skilled in the art would appreciate that the diameter of the shaft 10 may be altered to support increasingly heavier assemblies, whether the wind turbine assembly or blade assembly. Supported on an end of the shaft 10 opposite the blade assembly is the wind turbine assembly shown in FIG. 2. Connected to the shaft 10 attached to the shaft is a plurality of spoke 14 members extending radially outward away from the shaft 10 or a sleeve positioned on the shaft 10. In the preferred embodiment, the plurality of spoke 14 members are mounted to the shaft coupling rim, a sleeve that is similarly sized with the shaft and attached to the shaft by a weld or some other connection means capable of maintaining the shaft coupling ring 12 on the shaft 10 despite vibrational and/or thermal expansion and contraction forces.

It should be appreciated that although in the preferred embodiment, the supporting structure spoke 14 members, are attached to a shaft coupling ring which in turn is attached to the shaft, the spoke 14 members could be attached to the shaft and further, the shaft coupling ring could be formed as a unitary piece with the shaft. The supporting structure, such as for example spoke 14 members are shaped in the form of a "z" to provide a larger weld area, as well as increased structural rigidity to thereby prevent the spoke 14 members from collapsing, fatiguing or failing by some other failure mode. It should be appreciated that the spoke 14 members, as shown also in FIGS. 1-3, must be able to sustain the weight and forces exerted by wind on the blade assembly and the weight of the wind turbine assembly without occupying unnecessary amounts of space which would restrict the volume of air capable of being inducted into the wind turbine assembly through the spoke 14 members for cooling. Thus, the spoke 14 members provide a pivotal balance between providing the necessary structural rigidity for supporting the weight of the forces on the wind turbine assembly and blade assembly as well as leaving ample open space for forced air to be inducted through the spokes 14 for cooling. It should also be appreciated by those skilled in the art that the spoke 14 members may also take on other various forms such as a radially extending convex or concave member providing the necessary structural rigidity yet allowing air to be inducted and pass through the wind turbine assembly for cooling. The v-channel shape members, because of their larger weld area, would also help to reduce torsional bending.

Connected to an opposite end of each of the plurality of spoke 14 members is a spoke rim 16 (also called an intermediate band) as best shown in FIGS. 2 and 3. The spoke rim may be attached to each of the magnet cooling supports 18 using a weld or some other type of attaching means capable of withstanding many of the forces previously discussed. The spoke rim 16 could be constructed of rolled steel, pipe, plating or some other material capable of withstanding many of the considerations previously discussed. Attached along the outer periphery of the spoke rim 16 and extending outward radially from the intermediate band is a plurality of v-channel members. The magnet cooling supports 18 are fashioned in the shape of a "v" and may be connected to the spoke rim 16 using such connection means as previously discussed including a weld. The magnet cooling supports 18 may be constructed of rolled or stamped steel. The plurality of magnet cooling supports 18 could be constructed as a unitary piece or as single v-piece channel members connected together and to the spoke rim 16. The magnet cooling supports 18 have a substantially planar portion on their opposite side from the intermediate band. The substantially planar portion on each of the magnet cooling support 18 provides a suitable surface area for connecting the inner wheel 20 member to the plurality of Magnet cooling support 18 spaced circumferentially about the spoke rim 16, which is clearly shown in FIGS. 2 and 3. The magnet cooling supports 18 are configured along the outer perimeter or the spoke rim 16 to provide an air channel that passes through each magnet cooling support 18 from the front side to the back side to encourage the induction of air through the wind turbine assembly for cooling, as shown in FIG. 3. The inner wheel 20 serves as a mounting plate for the plurality of magnets 22 best illustrated in FIG. 3. Those skilled in the art can appreciate that the inner wheel 20 may include a tray, an array, a mounting, whether recessed or otherwise, to insure that the efficiency of the system or assembly is maintained. To secure the magnets 22 to an inner wheel 20, each of the magnets 22 may be epoxy coated and then connected to the inner wheel 20 using an epoxy adhesive to prevent flaking and degradation effects from exposure to impact, vibration and atmospheric conditions.

As best illustrated in FIGS. 2 and 3, each of the magnets 22 is attached to the inner wheel 20. Each magnet 22 is angled preferably at around 15° with respect to the outer perimeter edges 52 of the inner wheel 20. Pitching the magnets 22 at an angle helps break the cogging torque generated by the magnetic flux density within the wind turbine assembly. Although, it's preferred to pitch the angle of the magnets at between approximately 6-25° or 12° in one embodiment, it is understood that various pitch angles may be used from 5-45°, and that various types, sizes and magnetic materials may necessitate changing the angles of the magnets 22, in which case the angle of each magnet 22 with respect to the outer perimeter edges 52 of the inner wheel 20 may range from 7-30° to reduce the starting torque of the wind turbine assembly. Although the magnets 22 have been pitched at an angle with respect to the outer perimeter edges 52 of the inner wheel 20, it should also be appreciated that there are other means of breaking the cogging torque generated by the magnetic flux density within the wind turbine assembly, such as fashioning starter coils 26 within the wind turbine assembly to overcome the initial resistance to rotation resulting from the magnetic flux density within the wind turbine assembly; however, starter coils require additional hardware and components that could fail.

Another preferred method for attaching the magnets 22 circumferentially about the inner wheel 20 would be to employ a tapered magnet having a trapezoidal shaped cross-section. Due to the trapezoidal shape of each of the magnets, a raceway or housing having tapered edges could be fashioned into the inner wheel 20 such that the tapered magnets could be inserted into the raceway or housing and held within the raceway or housing the tapered edges of the raceway to secure the tapered magnets within the raceway or housing. Also, by tapering the magnets, the cross-linking magnetic influence can be reduced.

In the preferred embodiment, neodymium ferrite magnets could be used. The neodymium ferrite magnet offers a wide gauss variation making it very desirable for use as a magnet within the wind turbine assembly. Although neodymium magnets have been described as preferred, it is understood that other magnets would also be suitable for use if they met the required Gaussian specification and if they were amenable or could be modified to have a high enough heat tolerance resulting in less loss of magnetism while operating under high temperatures. Thus, in the preferred embodiment, the choice of magnet would offer such characteristics as an insignificant loss of lifting power despite a significant increase in the operating temperature of the wind turbine assembly or the ambient temperature in which the wind turbine assembly operates.

As previously discussed, the magnets 22 are spaced circumferentially about the inner wheel 20 and angled with respect to the outer peripheral edges 52 of the inner wheel 20. Magnets 22 are preferably spaced apart to form two separate rows circumferentially about the inner wheel 20. In choosing the material for constructing the inner wheel 20, the spoke 14 members, spoke rim 16 and magnet cooling supports 18, it is important to consider a material that has the requisite structural strength but that will not interfere or create magnetic loss within the system. This can be accomplished by using some of the aforementioned techniques such as trapezoidal shaped magnets 22 that slide into and are secured by similar shaped fixtures or raceways secured or rigidly attached to inner wheel 20. Another option would be to attach the magnets 22 to an inner wheel 20 constructed of a stainless steel band where epoxy resin is used to secure the magnets in place on the band. Still, another option would be to use a composite material shaped as a band for wrapping the magnets to the inner wheel 20. Still another means of securing the magnets to the inner wheel 20 would be to construct the inner wheel 20 out of any non-ferrous metals such as a series of wires.

It should be appreciated to this point that the structural components of the wind turbine assembly could be manufactured anywhere within the world by any stamping blank facility as opposed to more complex structural components which by necessity are manufactured, formed or shaped using molds or castings which are not economically viable or readily available throughout the world.

Positioned around the outer circumference of the magnets 22 attached to circumferentially about the inner wheel 20 is a transformer array 24. The transformer array 24 is arranged circumferentially about the outer wheel 27 attached to the frame 8. The present invention contemplates alternative configurations for the transformer array 24, whether for single or three-phase. The transformer array 24 is fashioned using a plurality of e-shaped coils. The e-shaped coil transformer would be the preferred transformer for use in the wind turbine assembly because the e-shaped coil is a readily available part, is relatively cheap, and can be purchased nearly anywhere. It is understood that with most conventional direct drive gearless turbines, the cores are each connected and surround individual coils or individual coils surround transformer coils. These systems are often very expensive and labor intensive to assemble considering the 600-400 separate coils that have to be interconnected in a series or parallel relationship. These systems are also prone to failure having electrical lead wires to each of the coils 26 as the coil 26 could short or interconnects could corrode and fail. For these and other reasons, including vibration, wind gusting, and other like considerations, given the potential for failure of one or more coils interconnected in a network of 40-400 including labor and wire complexity, the present invention contemplates a wind turbine assembly having a less rigorous fabrication process and a much greater success for long-term stability by replacing the traditional 40-400 individual coils with two large coils 26. To keep the coils 26 together, machine or braided wire wound between two supporting disks are bound and taped from a supporting coil 26 by insulating wires that wrap and keep them together. It is understood and should be appreciated by those skilled in the art that the cross-sectional shape of the coil 26 could be circular or square depending on the transformer configuration; although the preferred embodiment is a square cross section other configurations are contemplated. Each of the transformers 24 is attached to the outer wheel 27. Further, the outer wheel 27 may be mounted or attached to a rolled c-channel frame with coils mounted inside of the c-shaped transformer core which are held in place with an outer ring by a spot welding.

In the preferred form, the transformers 24 are made from laminate sections or slivers to thereby form the e-core. Laminations provide solid angle bars with minimal losses which retain electrical charge. The choice of the large coil 26 with transformers was economically advantageous, as all that was needed to increase the wattage output of the wind turbine assembly was to increase the size of the parts of the numbers of the coils 26 (e.g., two coils 26 would change the electrical output from 25 kW to 50 kW). In the preferred embodiment, the transformer coil would be constructed of laminate silicone steel. The coils 26 would have roughly 200-300 turns per coil 26 of copper wire which could also be aluminum or litz (braided wire) which would bring the cost down to make the transformer coil 26 affordable, reliable, simple and cost effective. When considering the positioning of the plurality of magnets 22 circumferentially positioned around the inner wheel 20, it is understood and appreciated by those skilled in the art that the plurality of magnets 22 could be positioned circumferentially around the outside of the transformer array 24. In the preferred embodiment of the present invention, the magnets 22 are positioned circumferentially about the interior of the transformer array 24 which offers several benefits and advantages over mounting the magnets 22 around the outer circumference of the transformer array 24. One advantage of the foregoing design includes reducing the starting torque by reducing the magnetic flux density in the wind turbine assembly. Additionally, cooling techniques, such as a water jacket are more easily readily implemented, as well as more effective when the water jacket may be positioned closely adjacent the transformer array 24, as the coils 26 are the foremost heat generating component within the wind turbine assembly.

Another advantage of mounting the magnets 22 around the inner circumference of the transformer array 24 on the inner wheel 20 is the ability to keep the coils 26 stationary within the wind turbine assembly. This means that, because the transformer is not being spun within the wind turbine assembly, slip rings or other support rings would not be used or needed as they represent a significant cost in the production of the wind turbine assembly.

Another advantage of the foregoing design of the preferred embodiment of the present invention includes the ability to more easily reinforce the outer drum for supporting the wind turbine assembly to thereby isolate the magnets from external heat (ambient heat) which if not sufficiently strong may warp and deform and cause the wind turbine assembly to be inoperable. Similarly, if a single wall shell is configured to support the magnets on the outside circumference of the transformer array, this single wall shell is invariably at risk of warping and/or deforming as the ambient temperature increases as well as the operating temperature of the wind turbine assembly. As previously discussed, it should be appreciated that the wind turbine assembly, because it is fully scalable, may be manufactured having larger or smaller electrical output ratings by simply increasing or decreasing the size of the individual components within the wind turbine assembly. Additionally, to increase the electrical output of each coil 26, it is understood and appreciated that the number of windings on the coil 26 may be increased to realize an increased electrical output in the wind turbine assembly.

As previously discussed, the wind turbine assembly is fully scalable, depending on the desired electrical output. For example, the wind turbine assembly may be configured with three separate transformer arrays 24 each positioned circumferentially about a plurality of magnets arranged circumferentially around an inner wheel 20. In this manner, the electrical output of the wind turbine assembly may be increased by increasing the number of transformers in the transformer array 24. It should be appreciated that the number of transformer arrays 24 may be increased or decreased depending on the desire for increased or decreased electrical output of the wind turbine assembly. Similarly, as the size of the wind turbine assembly is increased, the number of transformers in the transformer array 24 may be quartered so as to be transportable and more easily assembled.

As shown in FIGS. 2-3, a housing 30 covering a coolant containment weldment 28 is positioned circumferentially around the outer circumference of the transformer array 24. The coolant containment weldment is fashioned using a c-channel frame whereby the base of each transformer core may be attached to the inner circumferential surface of the c-channel frame by a spot weld. Thus, the c-channel frame and spot weld keep the transformer array 24 in position with respect to the coolant containment weldment.

Built into the coolant containment weldment 28 along the outermost circumference and adjacent the outer circumferential surface of the rolled c-channel frame is a cooling jacket or heat-radiating element designed to cool the transformer array. The cooling jacket may be a water cooling jacket or designed to carry some other liquid with a high-heat carrying capacity to thereby remove heat from the transformer array and within the wind turbine assembly. It is important that the transformer array 24 and wind turbine assembly be cooled to reduce and/or prevent fatigue or failure of the wind turbine assembly, including the transformer array 24 from operating at temperatures well over the ambient temperature. Cooling is also important because as the temperature, ambient or otherwise, begins to increase, the magnets 22 could begin to move or be displaced from the inner wheel 20 as the resins adhesive softens. Additionally, as the temperature increases within the wind turbine assembly, the magnets 22 lose their magnetic power or experience a reduction in the magnetic field which could ultimately cause the wind turbine assembly to short circuit and in worse circumstance catch fire. Also shown in FIG. 3 is a housing 30 surrounding the coolant containment weldment 28. The housing 30 may be separate from or the same unitary piece as the outer wheel 27 of the wind turbine assembly. Although the outer wheel 27 is shown as a separate piece for each transformer array, it should be appreciated that the outer wheel 27 may be a single unitary outer wheel 27 for one or more transformers arrays 24, such as is illustrated in FIGS. 1-3.

As is previously discussed, the wind turbine assembly provides an electrical output. It should be appreciated that the electrical output generated by the wind turbine assembly at the desired rotational velocity of the blade assembly would need to be electronically converted to preferably 60 hertz. This could be done by using a field effects transistor having an integrated rate transistor bias.

FIGS. 1-6 also illustrate the components necessary for rotatably supporting the shaft 10 connected to the wind turbine assembly and blade assembly. Because the wind turbine assembly or drum housing supports the coolant containment weldment and transformer array in a fixed and rigid fashion, the shaft must support rotation of the magnets within the transformer array positioned on the inner wheel 20. The shaft is rotatably supported within a bearing housing. In the preferred embodiment, the bearing housing is configured with double-tapered roller bearings on a single raceway providing end thrust as well as radial out thrust using a single bearing. These bearings, if sealed, may be drilled and tapped providing an orifice for injecting a lubricant for lubricating the bearings. To continually regenerate the lubricant being injected within the bearing house, a pump and lubricant reservoir could be placed at the base of the tower and connected to the bearings using tubing for regenerating the lubricant within the bearing housing. This configuration would be advantageous as the pump for injecting lubricant into the bearing housing represents a serviceable part, which would be placed at the base of the tower and accessible for service when needed. It can be appreciated that although the preferred embodiment for rotatably supporting the shaft has been described, in some smaller scales productions of the present invention magnetic suspension may be employed or some other rotatable bearing whether sealed or otherwise for rotatably supporting the shaft while turning under the torque of the blade assembly.

The bearing housing is attached to the frame 8 for rotatably supporting the rotation of the shaft 10. The frame (not shown) would be supported and mounted atop a tower (not shown). It is understood that the frame would be pivotally mounted atop the tower to thereby facilitate rotation of the wind turbine blade assembly based on the direction of the wind with respect to the blade assembly. It is preferred that the tower be a single pole or shaft to reduce the potential for failure under the torque of high velocity winds acting on the blade and wind turbine assembly.

It is further understood and appreciated that a quintessential consideration in wind turbine design is heat dissipation, which may be achieved by radiation, forced air or liquid cooling. For cooling the wind turbine assembly, forced air cooling channels may be fastened into the housing or drum of the wind turbine assembly; so that air passing by the blade assembly is forced through the air channels into the wind turbine assembly through the v- and spoke 14 webbing for cooling the wind turbine assembly. Additionally, an air gap or air space at the end of each row of magnets between the transformer arrays and/or magnets and the outer drum or housing may be formed to facilitate cooling of the transformer array or magnets within the wind turbine assembly.

Figure 4:
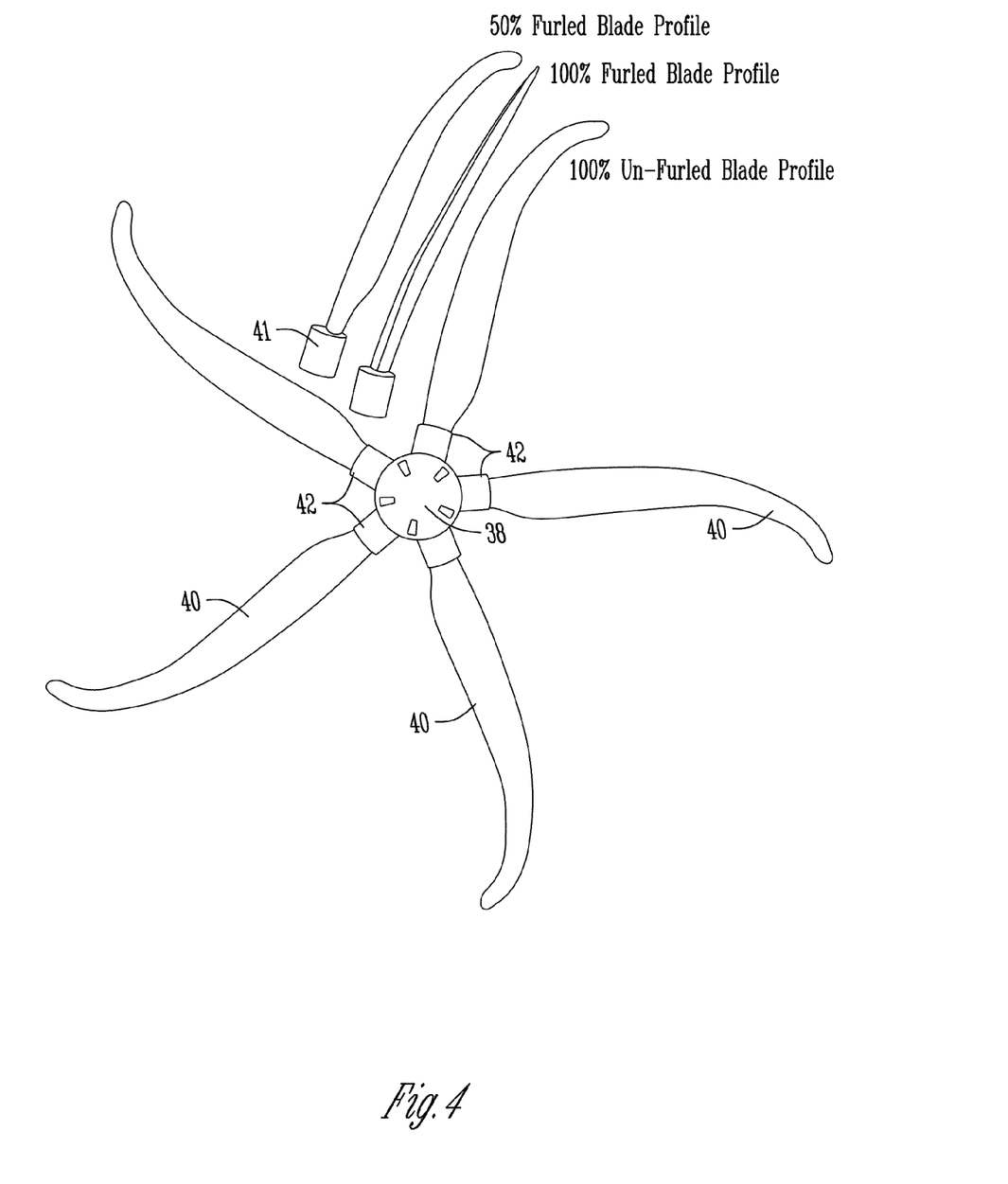
FIG. 4 is a front elevation view of the blade assembly in the fully furled, partially furled, and unfurled positions according to an exemplary embodiment of the present invention.
Figure 5:
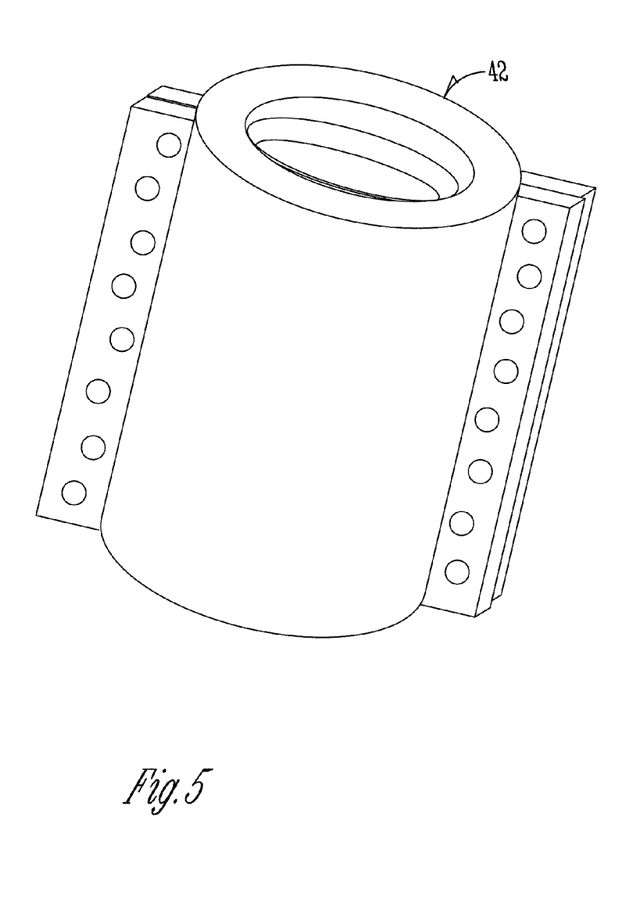
FIG. 5 is a perspective view of the blade socket and blade plug according to an exemplary embodiment of the present invention.

The blade assembly is shown in FIGS. 4-5. The blade 40 design is preferably a curved shape design, such as, for example a scimitar shape, to thereby increase the efficiency of the blade 40. Using the scimitar blade shape 40 helps the blade 40 cut through the wind rather than slap the wind when rotated, thereby reducing the efficiency of the blade 40 and increasing the wear and tear on the blade.

Figure 6:
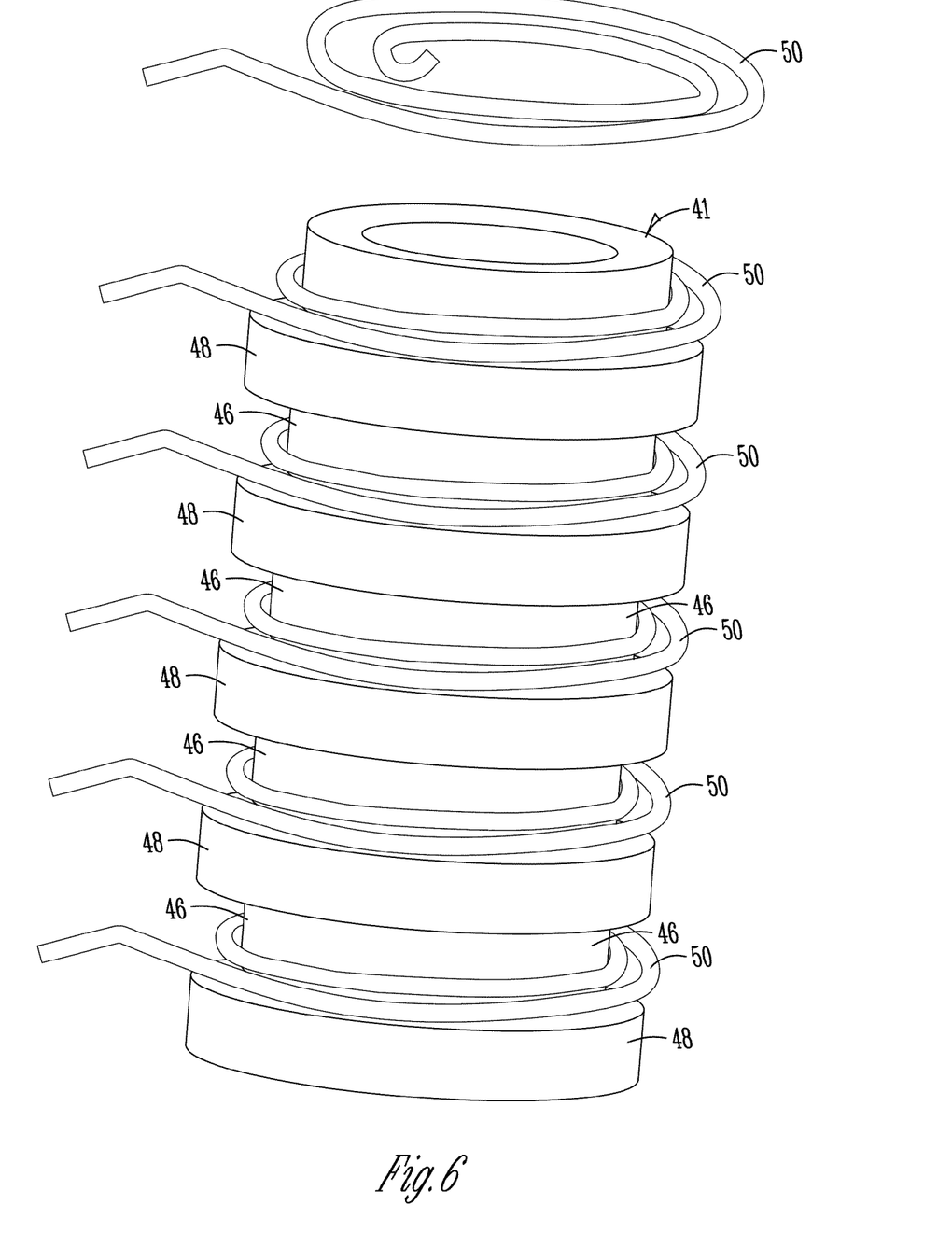
FIG. 6 is a perspective view of the blade plug with delrin bearing rings and spring winds according to an exemplary embodiment of the present invention.

Furthermore, by using the scimitar shaped blade 40, the blade 40 can be longer within the same rotational diameter to provide more surface area without increasing the torque at the base of the blade 40 and can ultimately run at lower wind speeds. Each blade is attached to the blade hub 38 using a blade socket 42 and blade plug 41 as shown in FIGS. 5 and 6. In the preferred embodiment, each blade 40 is attached to plug 41 which is pivotally supported within the socket 42 so as to allow the blade 40 to be furled into and out of the wind using the tensioning means such as the delrin bearing rings 46 and 48 with a corresponding spring winds 50 shown in FIG. 6. Using the delrin bearing rings 46 and 48 with a corresponding spring winds 50 makes it possible to furl the blades 40 without the use of gears and motors that are often used to turn the blades into and out of the wind. The blade 40 rests inside the blade plug 41 which is in turn inserted within the blade socket 42 and using the delrin bearing rings 46 and 48 with a corresponding spring winds 50 is furled out of the wind, turning the blade 40 out of the wind where the blade is normally kept into the wind in a neutral position. The neutral position is defined as when the blade is perpendicular to the wind. Thus, the blades 40, in the neutral position, are normally 90° to the wind force using the torsional force generated by the delrin bearing rings 46 and 48 with a corresponding spring winds 50 providing the effect of winding the blade 40 back to a neutral wind face. This is accomplished as the delrin bearing rings 46 and 48 with a corresponding spring winds 50 turn inside a keyway within the socket 42 of the plug. Although the preferred embodiment and furling the blades 40 has been described, it is understood that there are other non-motor means for turning the blades 40 into and out of the wind. For example, torsion bars could be included within the blade socket 42 and blade end plug 41 and adapted to bring the blades 40 from any position other than perpendicular to the wind force back to a position perpendicular with the wind force. Clearly, by using the delrin bearing rings 46 and 48 with a corresponding spring winds 50 for torsion bars and thereby limiting the need for motors, gears and other components for rotating the blades decreases the number of parts and the failure rates and modes that must be accounted for in the design of the wind turbine.

In the preferred embodiment, it is understood that each blade turns counterclockwise. However, each blade could be designed to turn clockwise as well. Using the scimitar design for a blade 40, the blade 40 may be designed thin enough that it can flex yet have sufficient rigidity to torque the blade 40 out of the wind when the wind forces become excessive. Thus, in operation, the blade 40 would furl out of the wind under excessive force from the wind, and the wing tip, as best illustrated in FIG. 4, would act as a brake. The wing tip portion shown in FIG. 4 would also allow the blade 40 to be turned at slower wind velocities. Similarly, using a scimitar-shape reduces blade velocity points on the blade 40 and subsequent blade velocity issues. As spoken of previously, the blade end tip provides several advantages. Positioned on the distal end of the blade and acting as an aileron tip, the end wing tip cuts down on the end turbulence forces and increases the lever arm on the blade by making it longer, providing more surface area into the wind. It should be appreciated that the end tips or ailerons could be mounted on the distal end of the blade in either a forward or backward orientation.

A method for generating electricity using a direct drive wind turbine according to one aspect of operation is also illustrated in FIGS. 1-6. As previously discussed, the wind turbine includes a frame 8 enclosed by a housing 30. The shaft 10 is rotatably supported by the frame 8. The magnet array 22 is attached to and arranged circumferentially about the inner wheel 20, which is in-turn attached to the shaft 10. The transformer array 24 is arranged circumferentially about the outer wheel 27 attached to the frame 8. By angling the magnets 22 relative to the inner wheel 20 at a preferred angle relative to a line perpendicular to opposing outer peripheral edges 52 of the inner wheel 20 reduces the cogging torque. The direct drive wind turbine generates electricity by rotating the inner wheel 20 within and relative to the outer wheel 27 to produce electricity. In another aspect of the present invention, each magnet is angled between 5-45 degrees relative to a line perpendicular to opposing outer peripheral edges 52 of the inner wheel 20 to reduce cogging torque. The turbine assembly includes and is driven by a blade assembly which includes, but is not limited to, a plurality of blades 40. Each blade 40 is attached to a plug 41 coupled within a socket 42 attached to a blade hub 38 attached to the shaft 10. A tensioning means enclosed within the socket 42 resists rotation of the blades 40 away from a neutral position (illustrated in FIG. 4 as the "100% un-furled blade profile where the blade would be facing into the wind). In one aspect of the present invention, the blades 40 are urged back to the neutral position (shown in FIG. 4) using the tensioning means. The present invention further contemplates that the blades 40 are self-tuning by automatically and instantaneously rotating out of the wind away from the neutral position under the force of and relative to the wind speed. This means that the blades 40 are kept in the neutral position, unless otherwise moved from the neutral position to a partially or fully furled position as best illustrated in FIG. 4. The present invention contemplates various tensioning means for resisting rotation of the blades 40 away from the neutral position, such as, for example: (a) urging the blades 40 toward the neutral position using Delrin bearing rings 46 and 48 with a corresponding spring winds 50 positioned between the plug 41 and the socket 42 to resist rotation of the socket 42 by the blade 40; (b) urging the blades 40 toward the neutral position using a tension arm positioned between the plug 41 and the socket 42 to resist rotation of the plug 41 within the socket 42 by the blade 40; or (c) urging the blade 40 toward the neutral position using any like mechanical stiffening, resistance or biasing member configured to continually resist movement of the blades 40 away from the neutral position and urge the blades 40 back toward the neutral position.

In the drawings and specification there has been set forth a preferred embodiment of the invention, and although specific terms are employed, these are used in a generic and descriptive sense only and are not for purposes of limitation. Changes in the form and the proportion of parts as well as in the substitution of equivalents are contemplated as circumstances may suggest or are rendered expedient without departing from the spirit or scope as further defined in the following claims.

What is claimed is:

1. A direct drive wind turbine comprising:
  a frame enclosed by a housing;
  a shaft rotatably supported by the frame;
  a magnet array arranged circumferentially about a transformer array within said housing and about said shaft to produce electricity;
  a blade assembly attached to said shaft, each blade being mounted generally perpendicular to the shaft, having a first end coupled to the shaft by a connection and a neutral position facing into the wind;
  tensioning means acting on the blade at said connection; and said tensioning means having a resistance to rotation of said blade away from the neutral position and out of the wind.

2. The direct drive wind turbine of claim 1 wherein one or more of the magnets in the array are angled to reduce cogging torque.

3. The direct drive wind turbine of claim 1 wherein the blade assembly further comprises a blade hub attached to said shaft having a plurality of blade sockets.

4. The direct drive wind turbine of claim 3 wherein the first end of each blade includes a plug coupled to the blade socket.

5. The direct drive wind turbine of claim 4 wherein said socket is attached on an outer circumferential surface of said blade hub.

6. The direct drive wind turbine of claim 1 wherein said tensioning means comprises a mechanical tensioner enclosed within said connection and acting on said first end of said blade.

7. A direct drive wind turbine comprising:
a blade assembly with blades having a blade end and opposite connecting end, the blade end having a neutral position facing into wind;
a hub attaching the blade assembly to a shaft for rotating a magnet array to generate electricity;
a plurality of circumferentially arranged sockets on said hub, the opposite connecting end of the blade coupled within the socket; and
tensioning means in said socket having a force acting against rotation of the opposite connecting end of the blade to keep the blade end generally in the neutral position.

8. The direct drive wind turbine of claim 7 wherein the blade end has a non-neutral position, the blades having an rpm in the neutral position and generally the same rpm in the non-neutral position by rotation of the blades out of the wind.

9. The direct drive wind turbine of claim 7 wherein the tensioning means comprises a delrin bearing ring with a corresponding spring positioned between said connecting end and said socket to resist rotation said blade.

10. The direct drive wind turbine of claim 7 wherein the tensioning means comprises a tension arm positioned between said connecting end and said socket to resist rotation.

11. The direct drive wind turbine of claim 7 wherein said tensioning means comprises a calibration of the force to automatically adjust blade rotation between the neutral and non-neutral position relative to the speed of the wind.

12. The direct drive wind turbine of claim 7 wherein said tensioning means comprises an auto-tune adjustment to turn said shaft at a continuous rpm by rotation of the blades away from said neutral position by force of the wind.

* * * * *